United States Patent [19]

Wills

[11] Patent Number: 4,937,580

[45] Date of Patent: Jun. 26, 1990

[54] GEOPHYSICAL RADAR APPARATUS AND METHOD

[75] Inventor: Robert H. Wills, Fairlee, Vt.

[73] Assignee: Trustees of Dartmouth College, Hanover, N.H.

[21] Appl. No.: 195,848

[22] Filed: May 19, 1988

[51] Int. Cl.⁵ .............................................. G01V 03/12
[52] U.S. Cl. ............................................................ 342/22
[58] Field of Search .................. 342/22, 201; 324/330, 324/332, 337, 344

[56] References Cited

U.S. PATENT DOCUMENTS

| | | |
|---|---|---|
| 3,806,795 | 4/1974 | Morey . |
| 3,831,173 | 8/1974 | Lerner . |
| 4,008,469 | 2/1977 | Chapman . |
| 4,045,795 | 8/1977 | Fletcher . |
| 4,072,942 | 2/1978 | Alongi . |
| 4,381,544 | 4/1983 | Stramm . |
| 4,430,653 | 2/1984 | Coon et al. . |
| 4,504,833 | 3/1985 | Fowler et al. . |
| 4,513,288 | 4/1985 | Weathers et al. . |

FOREIGN PATENT DOCUMENTS 0099385 6/1984 Japan .................................... 324/337

OTHER PUBLICATIONS

"Proposed Monocycle-Pulse Very-High-Frequency Radar for Air-Borne Ice and Snow Measurement", J. C. Cook, AIEE Transaction Paper #60-994, pp. 588-594 (1960).
"Research Directed to the Determination of Sub-Surface Terrain Properties and Ice Thickness by Pulsed VHF Propagation Method", A. R. Barringer, Barringer Research Limited, Toronto, Canada Report ARC-RL-64-936 to Air Force Camb. Research Labs (1965).
"Preliminary Investigations of Mine Detection in Cold Regions Using Short-Pulse Radar", S. A. Arcone, USA Cold Regions Research and Engineering Laboratory, CRREL Report 85-23 (1985).
"Geodar", R. M. Lerner et al., MIT Lincoln Laboratory Report, AD-595823L EPS-1 (1967). Declassified (1979).
"Continuous Subsurface Profiling by Impulse Radar", R. M. Morey, Proceedings of Engineering Foundation Conference on Subsurface Exploration for Underground Evacuation and Heavy Construction, 11-16 Aug. 1974, NH. NY: American Society of Civil Engrs, pp. 213-232.
"Polar Ionospheric Spread Echoes and Radio Frequency properties of Ice Shelves", S. Evans, *Journal of Geophysical Research*, 66(12), Shelves, S. Evans, *Journal of Geophysical Research*, 66(12), pp. 4137-4141 (1961).
"Gross Errors in Height Indication from Radio Altimeters Operating Over Thick Ice or Snow", A. H. Waite et al., Proceeding of the IRE, (1961).
"A Radio Echo Equipment for Depth Sounding in Polar Ice Sheets", Evans et al., *Journal of Scientific Instruments* (Journal of Physics E), Series 2, 2(2) pp. 131-136 (1968).
"Radio-Echo Sounding of the Lambert Glacier Basin", V. I. Morgan et al., *Journal of Glaciology*, 15(73) pp. 103-111 (1975).
"Radio-Echo Sounding: Glaciological Interpretations and Applications", G. de Q. Robin, Journal of Glaciology, 15(73) pp. 49-64 (1975).

(List continued on next page.)

*Primary Examiner*—Thomas H. Tarcza
*Assistant Examiner*—Mark Hellner
*Attorney, Agent, or Firm*—Hamilton, Brook, Smith & Reynolds

[57] ABSTRACT

A ground probing radar is described for detecting radar reflections from underground objects. The radar is of the pulse compression type. A transmitter generates a biphase digitally modulated carrier signal. The digital modulations comprise successive pairs of complementary codes. Reflections of the transmitted signal from underground objects are demodulated and cross-correlated with the code words to produce a reflectivity sequence signal. The use of complementary codes results in minimal time sidelobes and improved range and resolution.

15 Claims, 4 Drawing Sheets

OTHER PUBLICATIONS

"Radar Measurements of Borehole Geometry on the Greenland and Antarctic Ice Sheets," K. C. Jezek, Geophysics, 50(2), pp. 242-251 (1985).

"Quaternary Codes for Pulsed Radar", G. R. Welti, *IRE Transactions on Information Theory*, IT-6, pp. 400-408, New York, Institute of Radio Engineers (1960).

"Complementary Series", M. J. E. Golay, *IRE Transactions on Information Theory*, IT-7, pp. 82-87, New York, Institute of Radio Engineers (1961).

"High-Altitude Resolution Stratospheric Measurements with the Arecibo 430-MHz Radar", R. F. Woodman, *Radio Science* 15(2), pp. 417-422 (1980).

"Historical Perspective on Radar", D. K. Barton, *Microwave Journal*, pp. 21-38, Aug. 1980.

*IEE Colloquium* (Digest), C. R. Francis, pp. 7/1-7/5 (1984).

"Radar: New Techniques and Applications", E. Eastwood, *Physics in Technology*, pp. 101-109, (1977).

"CHIRP Doppler Radar", M. Bernfeld, *Proceedings of the IEEE*, vol. 72, No. 4, pp. 540-541 (1984).

"Intelligence Update: Eyes That See Into the Ground", J. D. Douglass, Jr., et al., *Defense News*, 1(46), pp. 38-43 (1986).

"A Digital Phase Coded Ground Probing Radar", Doctor of Engineering Thesis, Dartmouth College, New Hamsphire (Apr. 1987).

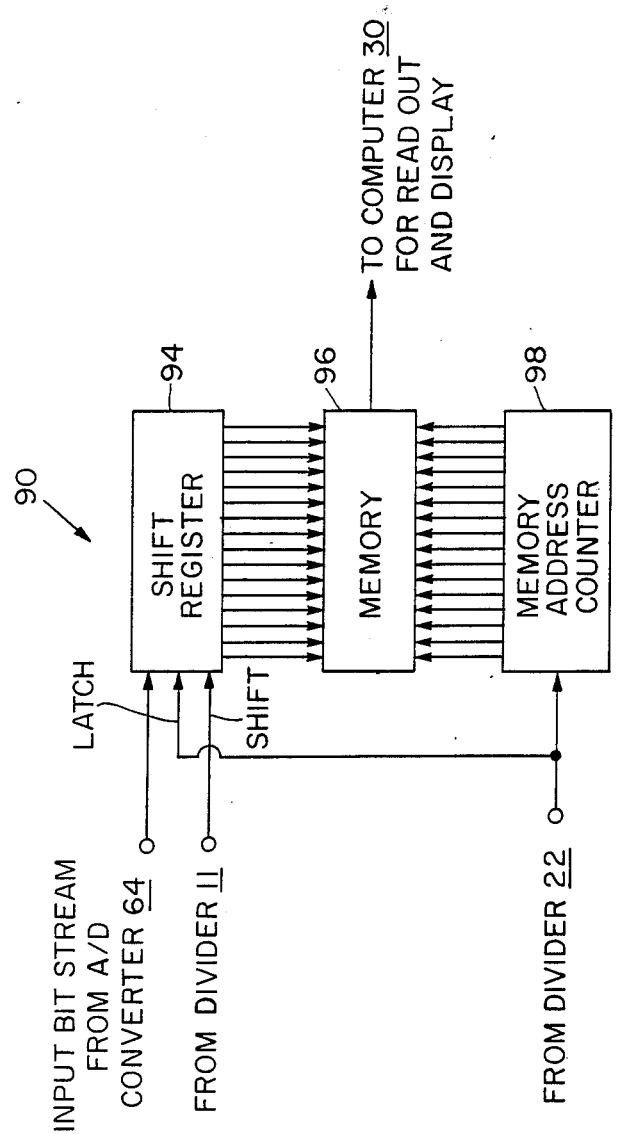

Sine Wave Carrier × CODE 1 $\begin{smallmatrix}+1\\-1\end{smallmatrix}$ = Phase Modulated Carrier    *Fig. 3*

Sine Wave Carrier × CODE 2 $\begin{smallmatrix}+1\\-1\end{smallmatrix}$ = Phase Modulated Carrier    *Fig. 4*

Complementary Codes of Length Eight

CODE 1 + CODE 2 = OUTPUT    *Fig. 5*

| CODE 1 | | CODE 2 | |
|---|---|---|---|
| 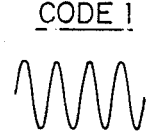 | Carrier | 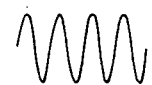 | *Fig. 6a* |
|  | Code |  | *Fig. 6b* |
|  | Modulated Carrier | 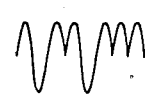 | *Fig. 6c* |
|  | Transmit Gating Envelope | 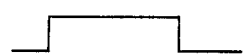 | *Fig. 6d* |
| 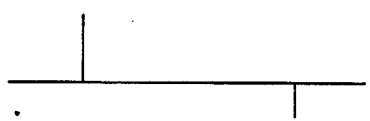 | Target Reflection Sequence | 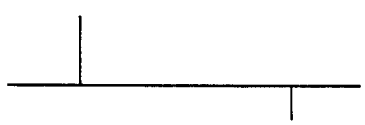 | |
*Fig. 6e*
| 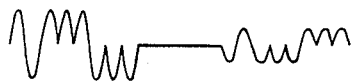 | Received Signal | 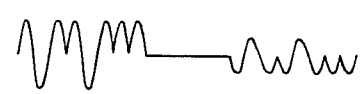 | |
*Fig. 6f*
|  | IF Signals |  | |
*Fig. 6g*
After Correlation
*Fig. 6h*
Correlated Signals Combined

GEOPHYSICAL RADAR APPARATUS AND METHOD

Government Support

The U.S. Government has rights to this invention pursuant to Contract No. 536115 (DACA 89-81-K-0004) awarded by U.S. the Army Cold Regions Research and Engineering Laboratory.

Background of the Invention

Short pulse or "impulse" VHF radars for geophysical applications were first proposed by Cook [Cook, J. C. "Proposed Monocycle Pulse VHF Radar for Airborne Ice and Snow Measurements", AIEE Transaction Paper #60-994, August 1960]. Such radars generate a short transmitted pulse (typically two to five half cycles long) by exciting the transmitting antenna with a video impulse and sampling the received signal from the same or a separate antenna, creating an audio frequency replica of the actual reflected waveform. The received signal is then displayed on an oscilloscope or a facsimile type recorder. A report by Barringer [Barringer, A. R., "Research Directed to the Determination of SubSurface Terrain Properties and Ice Thickness by Pulsed VHF Propagation", Barringer Research Limited, Toronto, Canada Report ARCRL-64-936 to Air Force Cambridge Research Laboratories, March 1965] arising from in-house research showed promising results in probing the ground and established the feasibility of fresh water ice thickness measurement by VHF radar.

In the late 1960's, several groups were funded by the U.S. Army Fort Belvoir Research and Development Center to study the detection of buried mines using short pulse radar techniques. This work has been recently reviewed by Arcone [Arcone, S. A. "Preliminary Investigations of Mine Detection in Cold Regions Using Short-Pulse Radar", U.S.A. Cold Regions Research and Engineering Laboratory, CRREL Special Report 85-23 (1985)]. The systems developed were allegedly capable of displaying single waveform returns, but no working system resulted that could provide continuous data in a readable format.

In the mid-1960's, R. M. Lerner et al. (GEODAR, Lincoln Laboratory Project Report EPS-1, Aug. 1, 1967, AD5958231) investigated the use of short pulse radar for locating underground tunnels. Lerner later obtained U.S. Pat. No. 3,831,173 in 1974 relating to a short pulse radar and a special transmission line type antenna for locating underground objects.

In the early 1970's, Morey [Morey, R. M., "Continuous Subsurface Profiling by Impulse Radar", In *Proceedings of Engineering Foundation Conference on Subsurface Exploration for Underground Excavation and Heavy Construction*, Aug. 11-16, 1974, Henniker, New Hampshire. New York: American Society of Civil Engineers, pp. 213-232], while working on aspects of the propagation of electromagnetic pulses from nuclear explosions saw ways of making a practical ground probing radar. He obtained U.S. Pat. No. 3,806,795 in 1974 relating to a certain type of antenna and transmit/receive network for use in ground probing radar.

In 1985, U.S. Pat. No. 4,504,833 was issued to Fowler et al. for a synthetic pulse radar system useful in impulse or short pulse radar for geophysical applications.

Concurrent with the development of short pulse ground probing radar, thought was being directed toward the radio echo sounding of glaciers. Evans [Evans, S., "Polar Ionospheric Spread Echoes and Radio Frequency Properties of Ice Shelves", *Journal of Geophysical Research* 66(12:4137-4141 (1961)], of the Scott Polar Research Institute, published the first paper indicating the possibility of sounding the depth of ice sheets with radio waves. This arose from observations of nulls at specific frequencies in ionospheric reflections from sounding stations positioned on polar ice sheets. Waite and Schmidt [Waite, A. H. and Schmidt, S. J., "Gross errors in Height Indication from Radio Altimeters Operating Over Thick Ice or Snow", *Proceedings of the IRE*, (1961)] found height indication errors from radio altimeters operating over thick ice and snow, which also showed the possibility of sounding the depth of ice sheets.

Since that time, many groups have built and used radars for sounding ice sheets [Evans, S. and Smith, B. M. E. "A Radio Echo Equipment for Depth Sounding of Polar Ice Sheets", *Journal of Scientific Instruments (Journal of Physics, E)*, Series 2, 2(2):131-136 (1968); Morgan, V. I. and Budd, W. F., "Radio-Echo Sounding of the Lambert Glacier Basin", *Journal of Glaciology*, 15(73):103-111 (1975); Robin G. De Q., "Radio-Echo Sounding: Glaciological Interpretations and Applications", *Journal of Glaciology*, 15(73):49-64 (1975); Jezek, K. C., "Radar Measurements of Borehole Geometry in the Greenland and Antarctic Ice Sheets", *Geophysics*, 50(2): 242-251 (1985)]. The radars used have generally been of the pulse-cw (rather than impulse) type with output records stored in intensity modulated form on a moving film strip. The transmitted waveform generally consists of about 10 cycles of sinusoidal carrier, at frequencies from 30 to 600 MHz. This results in poorer resolution than the impulse type radars, but far better range capability.

Geophysical applications for radars of the type described above include, inter alia, relatively shallow (less than 20 meters) subsurface mapping of soils, bedrock, water tables, glaciers and permafrost, depth surveys of fresh water lakes and rivers, measurement of the thickness of ice on frozen waterways and the location of underground utilities, such as pipes and cables. Investigations achieving greater than 20 meters depth are rare and mainly reported for ice sheets and glaciers.

The performance of present ground probing radar systems is fairly limited. Resolution is limited by the non-impulsive nature of the actual transmitted signal. Range capability is limited by low average transmitted power and is typically from one to twenty meters, depending on the electrical properties of the medium.

Despite the above interest in the field, the ability to map river depths greater than three meters from the air, or through a cover of ice, is still not currently available because of the limited range capability of commercially available short pulse radars. Airborne depth measurement would be of great use in monitoring sedimentation and in planning dredging operations in waterways. Dredging operations in rivers are very expensive. The cost is about one million dollars per acre-foot of material removed. The total 1987 U.S. budget for dredging in inland waterways exceeds a billion dollars. Improvements in river depth mapping could result in great cost savings for these programs.

There are four main problems with the present available "impulse" type ground probing radars:

1. The transmitted waveshape is dependent on the antenna type and loading caused by ground proximity.

The transmitted waveshape changes as the antenna moves over media with differing electrical properties.

2. Radiated waveforms are typically five half cycles, so each detected reflection appears as five bands on the output record. This greatly reduces resolution of closely spaced reflectors.

3. The need to make the transmitted pulse as short as possible in an impulse type radar, to achieve high resolution, is opposed to the need for long transmitted pulses to increase average transmitted power and thus radar range capability. In addition, the sampling process within the impulse radar reduces the pulse repetition frequency (PRF) from 50,000 Hz to an effective value of 8 per second. This greatly reduces the effective average transmitted power.

4. The shaping of transmitted waves solely by the transmitting antenna has been banned by international ITU treaty, since the demise of the spark transmitter. Impulse type radars could cause interference to essential communication services when used in airborne modes.

SUMMARY OF THE INVENTION

The present invention addresses and solves all four of the above-referenced problems by providing a wide bandwidth pulse compression type radar with digital coding modulated onto the transmitted radar carrier pulse signal. The pulse compression enables use of a longer, more well-defined, radar pulse. In the pulse compression radar of the present invention, the response of reflectors within the ground are received in real time rather than by sampling.

In a preferred embodiment, a digital code comprising a complementary binary code is phase modulated onto a sine wave carrier signal. Pairs of complementary binary codes, which typically have code lengths of any power of 2, i.e., 4, 8, 16, 32, etc. (but not limited to powers of two), are modulated onto the carrier and transmitted one after the other. These codes have the desirable property that when the autocorrelation function of the demodulated reflected return signal of both codes is added, a perfect autocorrelation response results, in which all the side lobes of the main central spike are cancelled.

Complementary codes were first described by Welti [Welti, G. R., "Quaternary Codes for Pulsed Radar", *IRE Transactions on Information Theory*, IT-6, pp. 400–408, New York, Institution of Radio Engineers (1960)] and Golay [Golay, M. J. E., Complementary Series, *IRE Transactions on Information Theory*, IT-7, pp. 82–87, New York, Institute of Radio Engineers (April 1961)]. Atmospheric radars using complementary codes have been described by Rabiner and Gold [Rabiner, L. R. and Gold, B. "Theory and Application of Digital Signal Processing", New Jersey, Prentice Hall, pp. 741–753 (1975)] and Woodman [Woodman, R. F., "High-Altitude Resolution Stratospheric Measurements with the Arecibo 430-MHz Radar", *Radio Science* 15(2):417–422 (1980)]. See also Weathers et al. U.S. Pat. No. 4,513,288 (1985) for a discussion of a radar using group-complementary codes.

The actual use of complementary codes in radar has been rather limited. The time response, and thus the range response offered by complementary coding is free from side responses. However, relative motion between the radar and the target during the time that successive codes are transmitted introduces range error, as does Doppler shifting of the received signal. Most commercial and military radar system are concerned with uncontrolled moving targets. Complementary codes are not particularly well suited for those applications. The ground probing case, however, is different, as the antennas may remain in a fixed position for as long as required, or at least may be constrained to move slowly.

The preferred embodiment, therefore, comprises a digital phase modulated radar system for ground probing and mapping and display of strata wherein the strata may comprise soil, bedrock, water, permafrost, glaciers, and the like. In the digital phase modulated embodiment, a carrier signal, which may be in the medium frequency, high frequency, VHF, UHF or low microwave region (1 MHz–10 GHz) frequencies, is phase modulated by complementary codes comprising successive complementary code words generated by a code generator circuit. The modulated carrier signal is amplified and coupled to a wideband antenna and propagated toward the ground strata. The signals reflected from the strata are captured by an antenna, amplified and demodulated to produce a replica of the original code words delayed in time by the time it takes for the round trip distance between the source and each reflector. The received signal is then digitized (at the code bit rate) and cross-correlated with the transmitted code word. The resulting time series for each successive code word are summed to eliminate time sidelobes, as described above. Two receiver channels with in-phase and quadrature local oscillators are used to enable capture of both the magnitude and phase of the received signal. The end result is a close approximation to the reflectivity sequence of the target. It is not an exact representation, as the received signal is a combination of the target, antenna and radar system transfer functions. The latter two are, however, well-defined and may be removed by additional signal processing, if necessary.

BRIEF DESCRIPTION OF THE DRAWINGS

FIG. 2 is a block diagram of a portion of the serial-to-parallel apparatus 68 and 70 of the receiver 200 shown in FIG. 1.

FIG. 3 is an illustration of code 1 the complementary coding method of the invention, as applied to modulate a sine wave carrier signal and the resultant phase modulated carrier.

FIG. 4 is an illustration of code 2 of the complementary coding method.

FIG. 5 illustrates a characteristic of complementary codes, that is, the sum of the autocorrelation functions of pairs of complementary codes produces a perfect autocorrelation response.

BEST MODE OF CARRYING OUT THE INVENTION

Figure 1:
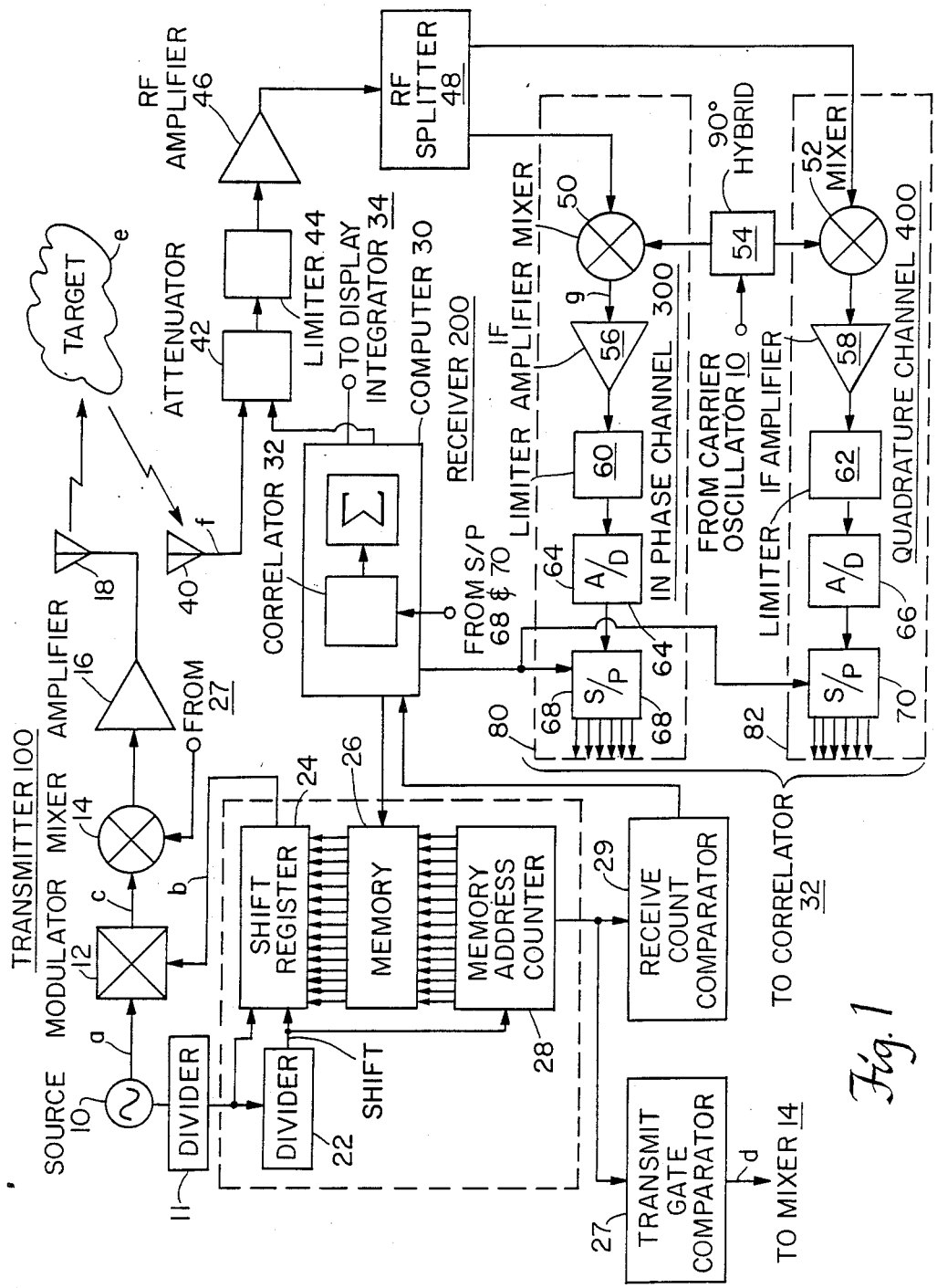
FIG. 1 is a block diagram of the transmitter and receiver apparatus of a preferred embodiment of the invention.

Referring now to FIGS. 1–6, a preferred embodiment of the invention will now be described in detail in connection therewith. Referring specifically to FIG. 1, a digital phase-coded ground probing radar is shown therein in block diagram form. In the radar apparatus of FIG. 1, timing information in the form of a digital code (FIG. 6b) is biphase-modulated onto a sine wave carrier signal (FIG. 6a). Other forms of modulation, such as amplitude or frequency modulation, could be used. The digital code is a binary code, which is equivalent to multiplying the carrier signal by + or −1, as shown in FIGS. 3 and 4.

Figure 6I:
FIG. 6 depicts amplitude versus time waveforms at various points in the system of FIG. 1.

Pairs of complementary codes which, in this preferred embodiment, have code lengths of any power of 2, are transmitted from the transmitter 100, one after another, i.e., codes 1 and 2 of FIG. 6b. These complementary codes have the desirable characteristic that when the autocorrelation functions of both codes are added, a perfect autocorrelation response results, producing a single central spike with no time sidelobes. The signal is designated the output in FIG. 5. The autocorrelation sidelobes of one code exactly cancels those of the other.

The carrier oscillator signal is generated by a radio frequency source 10 operating, for example, at 100 MHz. A modulation clock frequency, also 100 MHz, is generated by divider 11. In this embodiment, the division ratio of divider 11 is unity. Higher division ratio may be used to permit an increase in carrier frequency while keeping the modulating bit rate within technological limits. The carrier oscillator signal from source 10 is modulated in modulator 12 by the complementary codes generated in code generator 20. The code generator 20 generates a high speed digital code using a shift register 24 and a static RAM memory 26, which is addressed by memory address counter 28. The complementary codes are stored in memory 26 in segments of 16 bits. These segments are loaded sequentially into shift register 24 by memory address counter 28 at a rate which is a submultiple of the code bit rate. The code bit rate is established by divider 11 and may be equal to or an integral submultiple of the carrier frequency. The shift register is clocked, or shifted, by divider 11 operating at 100 MHz. The shift register is loaded by "divide-by-16" divider 22. Divider 22 divides the 100 MHz clock by 16 to produce the 6.66 MHz timing pulses used to load the shift register and to step the main addressing counter 28. The shift register 24 concatenates the segments from memory 26 into a continuous code word (FIG. 6b) which is coupled to modulator 12 to phase modulate the source carrier signal.

The advantage of this arrangement is that a bit rate of 100 MHz is produced while the loading from memory 26 into the shift register 24, is at only 6.6 MHz, thereby enabling the code generator circuit 20 to be produced from readily available, relatively inexpensive hardware.

The maximum code length is limited only by the size of the memory which, in a prototype embodiment, was 128K bits. At the start of each transmission, the main counter 28 is connected to the memory 26 and a start signal is generated by the computer 30. As each 16 bits of code are clocked out of shift register 24, the address counter 28 increments, making the next word available.

Optionally, the transmit signal (FIG. 6c) is gated using a pulse generated by the transmit gate comparator 27 (FIG. 6d) which drives balanced mixer 14. The mixer passes modulated carrier to the power amplifier 16 only during the transmit period. Mixer 14 thus acts as a gate to release only the desired length of code. Similar signals can be used to activate the transmitter power amplifier 16.

The gated modulated carrier signal is amplified in amplifier 16 and propagated from antenna 18 toward the ground for ground probing purposes. A simple target (ground, etc.) reflection sequence is shown in FIG. 6e. The two spikes indicate the presence of two reflecting bodies, the first with a positive reflection coefficient and the second with a smaller negative reflection coefficient. The reflected received signal (FIG. 6f) is picked up by antenna 40 and coupled to attenuator 42, the function of which is to limit the received signal so as not to overload the sensitive receiver circuitry. The attenuated signal is then limited to a maximum value in diode limiter 44 to protect the RF amplifier 46 and then amplified in IF amplifier 46 prior to being split into two separate channels, an in-phase channel 300 and a quadrature channel 400, by IF splitter 48.

Each channel of the receiver 200 demodulates a respective split signal in mixers 50 and 52, respectively. Note that the carrier oscillator signal from source 10 is also coupled to the hybrid 54 and from there to each of the mixers 50 and 52 in receiver 200 and is used as the local oscillator for mixing with the received signal to heterodyne the RF signal down to baseband in-phase and quadrature IF signals.

An optional low-pass filter may be included in each of the IF amplifiers 56 and 58. The demodulated IF signals (FIG. 6g) are then amplified in IF amplifiers 56 and 58 and limited by diode limiters 60 and 62. The IF analog signals are converted to digital format in A-D converters 64 and 66, respectively. Each bit of the A-D output is treated as a serial bit stream and converted from serial-to-parallel form in serial-to-parallel converters 68 and 70, respectively. They are then stored in fast random access memories within serial-to-parallel converters 68 and 70, until one reception is completed. The stored data is then read into the memory of general purpose computer 30, where signal processing comprising correlation and integration takes place.

The six parallel digital signals from converters 68 and 70 of each channel are then stored in computer 30 and cross-correlated (with the same code signal (FIG. 6b) that was loaded into shift register 24) by correlator 32. Correlator 32, is embodied in software. The function of the correlator is to identify or sort out the respective time delays incurred by the received signals from the various ground or below ground reflectors. It functions in the following way:

For each point in the received signal, it and the following Nc-1 points are added or subtracted according to the sign of the corresponding code bit, where Nc is the length of the code. This routine is written in assembly language as it is the most time consuming operation performed on the data. Clearly, correlation may also be performed in special purpose hardware circuits.

On a larger scale, full scans of data are preferably generated from four transmissions of different codes: $C_1$, $C_2$, $-C_1$ and $-C_2$, where $C_1$ and $C_2$ are the two successive complementary codes and $-C_1$ and $-C_2$ are the same codes, but multiplied by (−1). This procedure removes any d.c. offsets that may be in the system. Two channels of received data are generated [in-phase(I) and quadrature (Q)] for each code transmitted to preserve both magnitude and phase information. If no averaging is being performed, the magnitude and phase of the signal at each time step (or "bin") is calculated by the computer from:

$$\text{Magnitude} = \sqrt{I^2 + Q^2}$$

$$\text{Phase} = \tan^{-1}\left(\frac{Q}{I}\right)$$

If averaging is required, the values in the time bins for the in-phase and quadrature channels are summed independently for 1 ... $N_1$ full scans in integrator 34. Note that a scan is one fully processed received time series, i.e., four transmissions. Then the above calculations are performed by computer 30, at each time bin, on the sums. A further advantage of the two receiver channels is that separate integration of real and imaginary parts ("coherent integration") results in noise suppression proportional to the number of averaged signals. Integration of magnitude alone only reduces noise by the square root of the number of signals integrated.

For simplicity, the system shown in FIG. 1 uses a separate transmit antenna 18 and receive antenna 40. However, the invention is not intended to be so limited and the bi-static arrangement of FIG. 1 may be replaced by a single antenna using a transmit receive switch with appropriate impedance matching.

Antennas 40 and 18 may comprise folded dipoles, resistively loaded dipoles and/or log periodic antennas or any other suitable wide band antenna. In the receiver, preferably attenuator 42 is a digital attenuator controlled by computer 30, as shown in FIG. 1. This is an effective method for controlling the input signal level and thereby increasing the dynamic range of the receiver. It may, however, necessitate several scans at different input attenuations, which are then combined to make one final scan, since the dynamic range of the receiver 200 is limited to the sum of the dynamic ranges of the A-D converters 64 and 66 and the correlations and integration process within the computer 30.

Alternatively, therefore, it is contemplated that a range gain amplifier may be used in place of amplifier 46 to provide a changing gain dependent upon the range as the incoming signal is received to allow capture of a full dynamic range scan in one transmission.

The serial-to-parallel converters 68 and 70 operate in a similar manner to that of the code generator 20 in the transmitter in order to reduce the data rate. The output of each bit of each A-D converter 64 and 66, as shown in FIG. 2, is coupled to a shift register 94. The shift register 94 is clocked at the modulating bit rate of 100 MHz by divider 11 and is latched every 16 bits by the 6.6 MHz signal from divider 22. Each parallel word from shift register 94 is buffered and stored in static RAM memory 96. After each data storage, the memory address counter 98 is incremented by the 6.6 MHz signal from divider 22.

Preferably, the memory address counter 98 is the same memory address counter as the counter 28 in the transmitter 100. Therefore, synchronization between transmitter and receiver is assured. When the desired amount of data has been captured, receive comparator 29 halts the main counter and the contents of the receiver memory 96 are read into the memory of main computer 30 for processing. When the received data is contained in the main computer memory, it is then cross-correlated with the transmitted code stored in computer 30. The code length is generally relatively short, i.e., 128 bits. The raw data is in integer form and the code only has values of +1 and -1. Therefore, correlation may be performed directly in the time domain, rather than utilizing a fast Fourier transform in the frequency domain. The above embodiment is capable of operating with code lengths from 4 to 131,072. Code lengths greater than 16 produce significantly longer pulses than impulse type radars and are therefore preferred for increasing average transmitted power.

In summary, the advantages of the digital phase coded radar over conventional impulse type radars are:

1. Well-defined transmitted waveforms and low peak power which minimizes interference problems.
2. Reflectors produce single, rather than multiple, responses.
3. High average transmitted power, and hence greater range capability, is possible.
4. The availability of both magnitude and phase information allows coherent integration and imaging techniques to be performed, such as synthetic aperture radar (SAR) and tomography.

Equivalents

This completes the description of the preferred embodiments of the invention. However, many modifications thereof will become apparent to those skilled in the art. Accordingly, it is intended that this invention not be limited except as defined by the following claims and equivalents thereof.

I claim:

1. A pulse compression radar system for detecting objects or strata beneath ground including water or earth comprising:
   (a) a transmitter for generating a carrier signal;
   (b) a modulator for modulating said carrier signal with a digital code word comprising a complementary code;
   (c) antenna means for directing and transmitting said modulated signal toward the ground;
   (d) receiver means for detecting and demodulating reflections of the modulated signal from reflectors on or beneath the ground to produce a received signal corresponding to the original code word but delayed in time by the time it takes for the transmitted signal to travel from the antenna to the reflectors and back and wherein the receiver means includes an in-phase channel and a quadrature channel wherein the received signal is respectively mixed with the carrier signal to produce an in-phase demodulated signal component I and a quadrature demodulated signal component Q which is 90° out-of-phase with the in-phase component;
   (e) correlator means for cross-correlating the demodulated received signal with the original digital code word to produce a higher resolution time compressed version of the received signal.

2. The system of claim 1 wherein the carrier signal is phase modulated by pairs of complementary binary code words and the code length is 8 or greater.

3. The system of claim 2 wherein the pairs of complementary codes comprise a first pair of successive codes $C_1$ and $C_2$ and the next successive pair of complementary codes comprise $C_1$ and $C_2$ multiplied by $-1$.

4. The system of claim 1 wherein the magnitude of the received signal is determined by calculating the square root of the sum of the squares of I and Q and the phase of the received signal is determined by calculating $\tan^{-1}(Q/I)$.

5. The system of claim 1 wherein the digital code words are modulated onto the carrier signal by a code generator means comprising:
   (a) a computer means for generating said code words;
   (b) memory means for storing said code words in segments of N bits length wherein N is an integer;
   (c) shift register means being shifted at a code bit rate for concatenating said segments from said memory means into said code word;

(d) memory address counter means for coupling the segments in the memory means into the shift register at a rate which is a submultiple of said code bit rate.

6. The system of claim 5 wherein the carrier signal frequency is in the medium frequency to low microwave range of frequencies.

7. A pulse compression system for airborne or ground probing of earth strata, including soil, bedrock, water, ice and the like, comprising:
   (a) source means for generating a carrier frequency signal;
   (b) modulator means for modulating said carrier signal with pairs of successive complementary code words;
   (c) antenna means for propagating said modulated carrier signal in the direction of said earth strata;
   (d) receiver means for detecting and demodulating reflections of said propagated signal and wherein the receiver means includes an in-phase channel and a quadrature channel wherein the received signal is respectively mixed with the carrier signal to produce an in-phase demodulated signal component I and a quadrature demodulated signal component Q which is 90° out-of-phase with the in-phase component to produce received digital signals separated in time by the distance between reflecting objects;
   (e) correlator means for correlating said digital signals with said code words to identify the time delays and amplitudes of said reflections.

8. The system of claim 1 further including gating means for enabling transmission of said modulated carrier signal only at discrete intervals in time.

9. The method of detecting reflecting objects, such as river beds, strata, buried pipes, and the like, located beneath the ground wherein the ground includes rock, soil, water, ice, or the like, comprising the steps of:
   (a) generating a carrier signal;
   (b) modulating said carrier signal with a digital complementary code word;
   (c) directing and transmitting said modulated signal toward the ground;
   (d) detecting and demodulating reflections of the modulated signal from reflections on or beneath the ground to produce an analog received signal corresponding to the original code word but delayed in time by the time it takes for the transmitted signal to travel from the antenna to the reflectors and back and wherein the demodulation includes mixing the received signal with the carrier signal to produce an in-phase demodulated signal component I and a quadrature demodulated signal component Q which is 90° out-of-phase with the in-phase component I;
   (e) converting the received analog signal to a received digital signal;
   (f) correlating the received digital signal with the original digital code used to modulate the carrier signal to identify the time delays and amplitudes of the reflected signals.

10. The method of claim 9 wherein the carrier signal is phase modulated by pairs of complementary code words and the length is equal to 8 or greater.

11. The method of claim 10 wherein the pairs of complementary codes comprises a first pair of successive codes $C_2$ and $C_2$ and the next successive pair of complementary codes comprise $C_1$ and $C_2$ multiplied by $-1$.

12. The method of claim 11 wherein the magnitude of the received signal is determined by calculating the square root of the sum of the squares of I and Q and the phase of the received signal is determined by calculating $\tan^{-1}(Q/I)$.

13. The method of claim 9 wherein the digital code words are modulated onto the carrier signal by
   (a) storing said code words in memory in segments of N bits length wherein N is an integer;
   (b) concatenating said segments from said memory into said code word.

14. The method of claim 9 wherein the carrier signal frequency is in the medium frequency to low microwave range of frequencies.

15. A method for airborne or ground probing of earth strata, including soil, bedrock, water, ice and the like, comprising:
   (a) generating a carrier frequency signal;
   (b) phase modulating said carrier signal with pairs of successive digital complementary code words;
   (c) propagating said modulated carrier signal in the direction of said earth strata;
   (d) detecting and demodulating reflections of said propagated signal to produce received digital signals separated in time by the distance between reflecting objects and wherein demodulating includes mixing the received signal with the carrier signal to produce an in-phase demodulated signal component I and a quadrature demodulated signal component Q which is 90° out-of-phase with the in-phase component; and
   (e) correlating said digital signals with said code words to identify the time delays and amplitudes of the reflected signals.

* * * * *

UNITED STATES PATENT AND TRADEMARK OFFICE
CERTIFICATE OF CORRECTION

PATENT NO. : 4,937,580

DATED : June 26, 1990

INVENTOR(S) : Robert H. Wills

It is certified that error appears in the above-identified patent and that said Letters Patent is hereby corrected as shown below:

Col. 9, line 45, delete "reflections" and insert ---reflectors---.

Col. 10, line 14, delete "comprises" and insert ---comprise---.

Signed and Sealed this

Twenty-fourth Day of September, 1991

Attest:

HARRY F. MANBECK, JR.

Attesting Officer

Commissioner of Patents and Trademarks